United States Patent
Sairanen et al.

(10) Patent No.: US 7,107,009 B2
(45) Date of Patent: Sep. 12, 2006

(54) METHOD, SYSTEM AND COMPUTER PROGRAM PRODUCT FOR PERSONALIZING THE FUNCTIONALITY OF A PERSONAL COMMUNICATION DEVICE

(75) Inventors: Jarkko Sairanen, Espoo (FI); Marko Vanska, Espoo (FI)

(73) Assignee: Nokia Corporation, Espoo (FI)

( * ) Notice: Subject to any disclaimer, the term of this patent is extended or adjusted under 35 U.S.C. 154(b) by 511 days.

(21) Appl. No.: 10/179,237

(22) Filed: Jun. 26, 2002

(65) Prior Publication Data

US 2004/0003024 A1  Jan. 1, 2004

(51) Int. Cl.
*H04B 5/00* (2006.01)

(52) U.S. Cl. .................... 455/41.1; 455/418; 455/419; 455/557; 455/558; 340/572.1

(58) Field of Classification Search ............. 455/41.2, 455/418, 419, 556.2, 557, 558
See application file for complete search history.

(56) References Cited

U.S. PATENT DOCUMENTS

| | | | |
|---|---|---|---|
| 3,916,160 A | 10/1975 | Russo et al. | |
| 3,971,917 A | 7/1976 | Maddox et al. | |
| 4,692,603 A | 9/1987 | Brass et al. | |
| 4,728,783 A | 3/1988 | Brass et al. | |
| 4,745,269 A | 5/1988 | Van Gils | |
| 4,754,127 A | 6/1988 | Brass et al. | |
| 4,782,221 A | 11/1988 | Brass et al. | |
| 4,794,239 A | 12/1988 | Allais | |
| 4,874,936 A | 10/1989 | Chandler et al. | |
| 4,896,029 A | 1/1990 | Chandler et al. | |
| 4,924,078 A | 5/1990 | Sant' Anselmo et al. | |
| 4,939,354 A | 7/1990 | Priddy et al. | |
| 4,958,064 A | 9/1990 | Kirkpatrick | |
| 4,972,475 A | 11/1990 | Sant' Anselmo | |
| 4,998,010 A | 3/1991 | Chandler et al. | |
| 5,053,609 A | 10/1991 | Priddy et al. | |
| 5,118,369 A | 6/1992 | Shamir | |
| 5,124,536 A | 6/1992 | Priddy et al. | |
| 5,153,418 A | 10/1992 | Batterman et al. | |
| 5,189,292 A | 2/1993 | Batterman et al. | |
| 5,206,490 A | 4/1993 | Petigrew et al. | |
| 5,223,701 A | 6/1993 | Batterman et al. | |
| 5,243,655 A | 9/1993 | Wang | |
| 5,250,789 A | 10/1993 | Johnsen | |

(Continued)

FOREIGN PATENT DOCUMENTS

DE  10042914  4/2001

(Continued)

OTHER PUBLICATIONS

"vCard: The Electronic Business Card", Version 2.1, www.imc.org/pdi/vcardwhite.html, Download Date Feb. 5, 2002, 5 pages.

(Continued)

*Primary Examiner*—Matthew D. Anderson
*Assistant Examiner*—Minh D Dao
(74) *Attorney, Agent, or Firm*—Morgan & Finnegan, LLP

(57) ABSTRACT

A method, system, apparatus and computer program product for personalizing the functionality of a personal communication device. A personal communication device receives a wireless communication signal from one or more electronic tags. The signal is decoded by the personal communication device and the tag information is forwarded to a central processor of the device for executing the communication of data previously stored in a memory location, or triggering an application or service. The data, application or service is of interest to the user and relevant to the location the tags whose signal was received and processed by the device.

78 Claims, 7 Drawing Sheets

U.S. PATENT DOCUMENTS

| | | |
|---|---|---|
| 5,331,176 A | 7/1994 | Sant' Anselmo et al. |
| 5,369,261 A | 11/1994 | Shamir |
| 5,378,883 A | 1/1995 | Baterman et al. |
| 5,412,193 A | 5/1995 | Swartz et al. |
| 5,415,167 A | 5/1995 | Wilk |
| 5,449,895 A | 9/1995 | Hecht et al. |
| 5,478,989 A | 12/1995 | Shepley |
| 5,493,692 A | 2/1996 | Theimer et al. ............ 455/26.1 |
| 5,508,695 A | 4/1996 | Nelson et al. |
| 5,512,739 A | 4/1996 | Chandler et al. |
| 5,521,372 A | 5/1996 | Hecht et al. |
| 5,550,535 A | 8/1996 | Park |
| 5,559,707 A | 9/1996 | DeLorme et al. |
| 5,561,702 A | 10/1996 | Lipp et al. |
| 5,561,705 A | 10/1996 | Allard et al. |
| 5,572,653 A | 11/1996 | DeTemple et al. |
| 5,591,956 A | 1/1997 | Longacre, Jr. et al. |
| 5,592,375 A | 1/1997 | Salmon et al. |
| 5,612,524 A | 3/1997 | Sant' Anselmo et al. |
| 5,629,981 A | 5/1997 | Nerlikar |
| 5,630,068 A | 5/1997 | Vela et al. |
| 5,642,303 A * | 6/1997 | Small et al. ................ 708/109 |
| 5,649,114 A | 7/1997 | Deaton et al. |
| 5,649,187 A | 7/1997 | Hornbuckle |
| 5,666,214 A | 9/1997 | MacKinlay et al. |
| 5,682,142 A | 10/1997 | Loosmore et al. |
| 5,715,314 A | 2/1998 | Payne et al. |
| 5,729,697 A | 3/1998 | Schkolnick et al. |
| 5,732,229 A | 3/1998 | Dickinson |
| 5,764,736 A | 6/1998 | Shachar et al. .......... 379/93.09 |
| 5,764,739 A | 6/1998 | Patton et al. |
| 5,794,142 A | 8/1998 | Vanttila |
| 5,799,091 A * | 8/1998 | Lodenius .................... 380/270 |
| 5,811,776 A | 9/1998 | Liu |
| 5,821,513 A | 10/1998 | O'Hagan et al. |
| 5,850,187 A | 12/1998 | Carrender et al. |
| 5,886,646 A | 3/1999 | Watanabe et al. |
| 5,933,829 A | 8/1999 | Durst et al. |
| 5,948,040 A | 9/1999 | DeLorme et al. |
| 5,949,335 A | 9/1999 | Maynard |
| 5,959,530 A | 9/1999 | Lupien, Jr. et al. |
| 5,970,469 A | 10/1999 | Scroggie et al. |
| 5,978,773 A | 11/1999 | Hudetz et al. |
| 5,979,757 A | 11/1999 | Tracy et al. |
| 6,019,449 A | 2/2000 | Bullock et al. |
| 6,023,241 A | 2/2000 | Clapper |
| 6,026,375 A | 2/2000 | Hall et al. |
| 6,029,064 A | 2/2000 | Farris et al. |
| 6,039,430 A | 3/2000 | Helterline et al. |
| 6,055,442 A | 4/2000 | Dietrich |
| 6,058,304 A | 5/2000 | Callaghan et al. |
| 6,108,656 A | 8/2000 | Durst et al. |
| 6,138,009 A | 10/2000 | Birgerson |
| 6,154,745 A | 11/2000 | Kari et al. .................. 707/100 |
| 6,176,427 B1 | 1/2001 | Antognini et al. |
| 6,177,860 B1 | 1/2001 | Cromer et al. |
| 6,199,048 B1 | 3/2001 | Hudetz et al. |
| 6,223,988 B1 | 5/2001 | Batterman et al. |
| 6,249,226 B1 * | 6/2001 | Harrison et al. .......... 340/572.1 |
| 6,259,367 B1 | 7/2001 | Klein |
| 6,295,506 B1 | 9/2001 | Heinonen et al. |
| 6,308,203 B1 | 10/2001 | Itabashi et al. ............. 709/217 |
| 6,312,106 B1 | 11/2001 | Walker |
| 6,314,457 B1 | 11/2001 | Schena et al. |
| 6,327,570 B1 | 12/2001 | Stevens |
| 6,332,062 B1 | 12/2001 | Phillips et al. |
| 6,356,543 B1 | 3/2002 | Hall et al. |
| 6,370,389 B1 | 4/2002 | Isomursu et al. |
| 6,389,278 B1 | 5/2002 | Singh |
| 6,397,057 B1 | 5/2002 | Malackowski et al. |
| 6,401,085 B1 | 6/2002 | Gershman et al. |
| 6,446,004 B1 | 9/2002 | Cao et al. |
| 6,446,208 B1 | 9/2002 | Gujar et al. |
| 6,448,979 B1 | 9/2002 | Schena et al. |
| 6,456,039 B1 | 9/2002 | Lauper et al. ............... 320/107 |
| 6,462,660 B1 * | 10/2002 | Cannon et al. .......... 340/572.1 |
| 6,470,096 B1 | 10/2002 | Davies et al. |
| 6,491,217 B1 | 12/2002 | Catan |
| 6,494,562 B1 | 12/2002 | Walker et al. |
| 6,512,919 B1 | 1/2003 | Ogasawara |
| 6,542,933 B1 | 4/2003 | Durst, Jr. et al. |
| 6,577,901 B1 | 6/2003 | Thompson |
| 6,587,684 B1 | 7/2003 | Hsu et al. |
| 6,611,673 B1 | 8/2003 | Bayley et al. |
| 6,622,017 B1 | 9/2003 | Hoffman |
| 6,641,051 B1 | 11/2003 | Illowsky et al. |
| 6,647,269 B1 | 11/2003 | Hendrey et al. |
| 6,650,761 B1 | 11/2003 | Rodriguez et al. |
| 6,678,425 B1 | 1/2004 | Flores et al. |
| 6,687,793 B1 | 2/2004 | Thomas et al. |
| 6,753,883 B1 | 6/2004 | Schena et al. |
| 2001/0011247 A1 | 8/2001 | O'Flaherty et al. ............ 705/39 |
| 2001/0018349 A1 | 8/2001 | Kinnunen et al. |
| 2001/0041566 A1 | 11/2001 | Xanthos et al. ............. 455/423 |
| 2002/0039909 A1 | 4/2002 | Rankin ....................... 455/558 |
| 2002/0086680 A1 * | 7/2002 | Hunzinger ................... 455/456 |
| 2002/0087392 A1 | 7/2002 | Stevens |
| 2002/0087529 A1 | 7/2002 | Dutcher et al. |
| 2002/0094797 A1 | 7/2002 | Marshall et al. ............. 455/403 |
| 2002/0095456 A1 | 7/2002 | Wensheng |
| 2002/0121544 A1 | 9/2002 | Ito et al. |
| 2002/0122055 A1 | 9/2002 | Parupudi et al. |
| 2002/0130178 A1 | 9/2002 | Wan et al. |
| 2002/0151326 A1 | 10/2002 | Awada et al. |
| 2002/0165008 A1 | 11/2002 | Sashihara et al. |
| 2003/0017848 A1 | 1/2003 | Engstrom et al. |
| 2003/0019929 A1 | 1/2003 | Stewart et al. ............... 235/385 |
| 2003/0030542 A1 | 2/2003 | von Hoffmann ........... 340/5.61 |
| 2003/0056019 A1 | 3/2003 | Kehr et al. ................. 709/310 |
| 2003/0074566 A1 | 4/2003 | Hypponen |
| 2003/0088496 A1 | 5/2003 | Piotrowski |
| 2003/0191839 A1 | 10/2003 | Seljeseth |
| 2003/0194989 A1 | 10/2003 | Guion |
| 2004/0000585 A1 | 1/2004 | Silverbrook et al. |
| 2004/0083138 A1 | 4/2004 | Silverbrook et al. |
| 2004/0189635 A1 | 9/2004 | Hoisko |

FOREIGN PATENT DOCUMENTS

| | | |
|---|---|---|
| EP | 0801512 | 10/1997 |
| EP | 0853287 | 7/1998 |
| EP | 1059599 | 12/2000 |
| EP | 1130495 | 9/2001 |
| EP | 1130933 | 9/2001 |
| EP | 1 197 905 A2 | 4/2002 |
| FI | 2002/2288 | 12/2002 |
| GB | 2 246 491 A | 1/1992 |
| WO | WO 97/10558 | 3/1997 |
| WO | WO 97/17790 | 5/1997 |
| WO | WO 97/28736 | 8/1997 |
| WO | WO 97/41654 | 11/1997 |
| WO | WO 97/46960 | 12/1997 |
| WO | WO 98/35469 | 8/1998 |
| WO | WO 99/17230 | 4/1999 |
| WO | WO 99/30257 | 6/1999 |
| WO | WO01/06507 | 7/1999 |
| WO | WO01/45319 | 12/1999 |
| WO | WO 00/16507 | 3/2000 |
| WO | WO01/74406 | 12/2000 |
| WO | WO 01/17297 | 3/2001 |
| WO | WO01/20542 | 3/2001 |
| WO | WO 01/25985 | 4/2001 |
| WO | WO01/39103 | 5/2001 |
| WO | WO01/39108 | 6/2001 |

| | | |
|---|---|---|
| WO | WO01/45038 | 6/2001 |
| WO | WO 01/45061 A2 | 6/2001 |
| WO | WO 01/47291 | 6/2001 |
| WO | WO01/73687 | 10/2001 |
| WO | WO 01/75815 A2 | 10/2001 |
| WO | WO01/99410 | 12/2001 |
| WO | WO 02/07474 A1 | 1/2002 |
| WO | WO 2004/003829 | 1/2004 |
| WO | WO 2004/027689 | 4/2004 |
| WO | WO 2005/101337 | 10/2005 |

OTHER PUBLICATIONS

"vCard Overview", www.imc.org/pdi/vcardoverview.html, Download Date Feb. 5, 2002, 3 pages.

"Products Using vCard and vCalendar Technology", www.imc.org/pdi/pdiprodslist.html, Download Date Feb. 5, 2002, 9 pages.

Mandato D. et al., "CAMP: A Context-Aware Mobile Portal", IEEE Communications Magazine, vol. 40, No. 1, Jan. 2002, pp. 2, 4 and 90-97.

Electronic User's Guide for Nokia 6310i, 9354260, Issue 1, 2002, pp. 1-117.

U.S. Appl. No. 10/180,267, filed Jun. 26, 2002, Heikki Huomo et al.
U.S. Appl. No. 10/284,253, filed Oct. 31, 2002, Marko Perttilä et al.
U.S. Appl. No. 10/174,405, filed Jun. 17, 2002, Marko Vanska et al.
U.S. Appl. No. 10/191,735, filed Jul. 8, 2002, Marko Vänskä et al.

"Radio Frequency Identification—RFID: A Basic Primer", Jan. 5, 2000, www.ettm.com.

"UMTS and Mobile Computing"; Alexander Joseph Huber & Josef Franz Huber., Mar. 2002, Artech House Mobile Communication Series; pp. 170-187 and 231-232.

U.S. Appl. No. 10/728,915, filed Dec. 8, 2003, Engestrom et al.
U.S. Appl. No. 10/286,221, filed Nov. 1, 2002, Marko Vanska et al.
U.S. Appl. No. 10/291,038, filed Nov. 8, 2002, Marko Vanska.

"CodeXML Router—Bluetooth Edition", http//www.gocode.com/products/coderouter.htm, 2 pages, printed on Jul. 2, 2004.

"CodeXML Bluetooth Modem", product sheets (2 pp), printed from www.gocode.com on Jul. 2, 2004.

"CodeXML Router—Bluetooth Edition", product sheets (2 pp), printed from www.gocode.com on Jul. 2, 2004.

"Code Router BE Diagram", http://www.gocode.com/routerdiagram.htm, 1 page, printed on Jul. 2, 2004.

"CodeXML Maker Pro", http://www.gocode.com/products/maker.htm, 1 page, printed on Jul. 2, 2004.

"CodeXML Maker Pro Screen", http://www.gocode.com/products/images/makerpro-screen.jpg, 1 page, printed on Jul. 2, 2004.

"CodeXML Bluetooth Modem", http://www.gocode.com/products/modem.htm, 1 page, printed on Jul. 2, 2004.

"Code Router BE Use Case Diagram", http://www.gocode.com/routerdiagram2.htm, 1 page, printed on Jul. 2, 2004.

"GoCode—Secure Data Solutions", http://www.gocode.com/products/gocode.htm, 3 pp, printed on Jul. 2, 2004.

NeoMedia Technologies Inc., "Patent Infringement Lawsuit Brought by NeoMedia Against AirClic Inc., Scanbuy, Inc., and LScan Technologies Inc.", dated Jan. 26, 2004, 2 pages, http://www.neom.com/corporate/press/2004/20040126.jsp, printed Apr. 15, 2004.

Symbol Technologies Ltd., "Solutions 8 Fastfrog Case Study", http://www.symbol.com/uk/News/solutions_8_fastfrog_case_stud.html, 2 pages, printed on Apr. 15, 2004.

"CueCat Barcode scanner from Digital Convergence Information", http://www.cuecat.com, 2 pages, printed on Sep. 16, 2005.

iTCaseStudies.com "Uniting Space and Place for Future Growth", 4 pages, http://www.itcasestudies.com/case/ret37.html, printed on Apr. 15, 2004.

Stephen Satchell, "CueCat Principles of Operation", 4 pages, http://www.fluent-access.com/wtpapers/cuecat, printed on Apr. 15, 2004.

Symbol Technologies, Inc. "Symbol Technologies' Consumer Scanners Provide Mall Shoppers With Internet Shopping Experience", dated Dec. 6, 1999, 3 pages, http://www.symbol.com/news/pressreleases/press_releases_retail_consumer.html, printed on Apr. 15, 2004.

NeoMedia Technologies, "Virgin Entertainment, Virgin Megastore Online and Virgin Mega Store Are Charged with Patent Infringement by NeoMedia Technologies, Inc.", dated Jan. 5, 2004, 2 pages, http://www.neom.com/corporate/press/2004/20040105.jsp, printed on Apr. 15, 2004.

12snap UK Ltd. "12snap That's Mobile Marketing", 38 pages, http://www.12snap.com/uk/index2.html, printed on Apr. 15, 2004.

U.S. Appl. No. 10/882,619, filed Jul. 2, 2004, Suomela et al.

Aim White Paper: "Introduction to Radio Frequency Identification (RFID) - A Basic Primer", The Association of the Automatic Identification and Data Capture Industry, [Online] Aug. 23, 2001, pp. 1-17; http://www.aimglobal.org/technologies/rfid/resources/RFIDPrimer.pdf.

* cited by examiner

| | 1 | 2 | 3 | 4 |
|---|---|---|---|---|
| A | Relevant Items Tagged | 300 - Jogging Shorts | 302 - Ski Jacket<br>305 - Car Keys | 307 - Suit<br>309 - Brief Case<br>310 - Car |
| B | Recognition Script | Day Off: 300 | Ski Trip: 302; 305 | Work Day:<br>307; 309; 310 |
| C | Corresponding Template | Jogging Routes;<br>Jogging Friends | Ski Locations; Ski Conditions | Buisness Meetings;<br>Day Calender |
| D | Activity |  |  |  |

METHOD, SYSTEM AND COMPUTER PROGRAM PRODUCT FOR PERSONALIZING THE FUNCTIONALITY OF A PERSONAL COMMUNICATION DEVICE

FIELD OF THE INVENTION

A method, system, apparatus and computer program product for personalizing the functionality of a personal communication device. In particular, the system, method, apparatus and computer program product provides a personal communication device equipped with an electronic tag reader for receiving signals from a plurality of electronic tags and executing the communication of data that is of interest to the user and relevant to the location of the electronic tags, or triggering a service or an application.

BACKGROUND OF THE INVENTION

Personal communication devices are now used in many aspects of every day life. Thus, the amount and type of data that can be utilized with these devices is essential to their efficient use. In fact, the more relevant the information is to a user's everyday life, the more useful the personal communication device becomes. However, it is difficult to determine what is the most relevant data for the user and in what situation that data would be of the most use. To this end, it would be helpful to determine the movements or habits of a user to give more insight to a user's specific interests and needs. One solution for determining the movement of a person or item is the use of Radio Frequency Identification (RF-ID) wireless systems.

A RF-ID wireless system is a relatively new approach to automatically identifying, categorizing and locating people and assets over a relatively short distance (substantially zero to hundreds of feet). The RF-ID labels are known as tags or transponders and they contain varying amount of information ranging from an ID number programmed into the tag at the factory to a 128 K bytes variable memory that can be programmed by a controller unit using RF radiation. The controller unit is usually referred to as a reader or interrogator.

RF-ID interrogators communicate with the tags through the use of radio frequency (RF) energy. The interrogator sends out an RF signal which "wakes up" the tag, and the tag then transmits a signal back to the interrogator via an RF frequency signal. RF-ID wireless network principles are described in a publication entitled "Radio Frequency Identification: A Basic Primer," published by the Automatic Identification Manufacturers (AIM) web site (http://www.aimglobal.org), Oct. 23, 2001 and fully incorporated herein by reference. Attempts have been made to utilize RF-ID wireless networks for various applications.

U.S. Pat. No. 5,682,142 is directed to a network system of fixed position and movable tag nodes. Each node includes a microprocessor element, pre-programmed to recognize external environmental conditions and to logically act on the basis of the recognized condition parameters and communicate with other nodes in the network. The nodes provide an independently operable overall network that has a defined area of operation capable of location identification, logical control of preprogrammed environmental conditions and logical interaction with external inquiries for transactional operations.

PCT publication WO0145038 is directed to a short range communication system. An interrogator is held near a person whose clothing contains multiple transponders. The interrogator and/or the transponders may be held in an article of clothing or in the personal effects of a person. The transponder transmits identifying information associated with the state of the article of clothing or personal effect. The system enables the clothes to communicate with a plurality of items and obtain useful information. Additionally, the system may be configured so that any particular transponder may communicate with another transponder or group of transponders of other locales to activate functions, cause actions or otherwise share data and/or information.

PCT Publication WO01/39108 discloses a system that includes a mobile communication unit wherein a RF-ID identification module is added between the radio port and an antenna in a mobile telephone that includes a Bluetooth function. The module comprises a mixer for transposing identification messages from identification devices in a 2.45 GHz RF-ID system of the backscatter type to a baseband for further processing in a computer part of the unit. The unit may communicate with a super ordinate system, via a standard call channel or Bluetooth channel. The unit is also cabled to send information to the identification devices for alerting or transmitting data, wherein modulation and encoding can be effected in accordance with the Bluetooth standard enabling the mixer to be included as an integral part of a standard Bluetooth radio.

However, none of the RF-ID systems described above suggest personalizing the functionality of a personal communication device based on the information obtained from the RF-ID wireless devices to increase the efficiency of the device.

Thus, it is desirable to provide a method, system, apparatus and computer program product that provides improved personalized functionality of a personal communication device for more efficient use of the device. The method, system, apparatus and computer program product of the present invention disclosed herein address this need.

SUMMARY OF THE INVENTION

To overcome limitations in the prior art described above, and to overcome other limitations that will be apparent upon reading and understanding the present application, the present invention is directed to a method, system, and computer program product for increasing the personalized functionality of a personal communication device. More specifically, the present invention utilizes a personal communication device with an electronic tag reader that receives signals from a plurality of electronic tags placed proximately to the personal communication device. A person may have more than one personal communication device and even use them simultaneously. The tags are active or passive, and are placed in specific locations pertinent to the user. Upon receipt of a signal from one or more electronic tags, the tag reader in the personal communication device decodes the signals and forwards the tag information to the central processor of the device. The central processor then prompts and executes the communication of the relevant data, services and/or applications to the user. The data displayed, the services and/or applications are of interest to the user and relevant to the location of the one or more tags whose signals are received and processed by the personal communication device.

It is an object of the invention that the plurality of tags are located in different locations and conform to RF, Bluetooth or other wireless communication technologies.

It is also an object of the invention that the tags are comprised of personal and external tags placed in locations pertinent to the user.

It is an object of the invention that the plurality of tags and the personal communication devices are wireless devices.

It is an object of the invention that personal communication device includes a network connection for transmitting and receiving data.

It is an object of the invention that the personal communication device is a cellular telephone, a satellite telephone, a personal digital assistant or a Bluetooth device.

It is an object of the present invention that the electronic tags transmit ID information for providing a predefined function to the user of the personal communication device.

BRIEF DESCRIPTION OF THE DRAWINGS

The accompanying figures best illustrate the details of the method, system, apparatus and computer program product for personalizing the functionality of a personal communication device. Like reference numbers and designations in these figures refer to like elements.

DETAILED DESCRIPTION OF THE INVENTION

In the following description of the various embodiments, reference is made to the accompanying drawings which form a part hereof, and in which is shown by way of illustration various embodiments in which the invention may be practiced. It is to be understood that other embodiments may be utilized and structural and functional modifications may be made without departing from the scope of the present invention.

Figure 1:
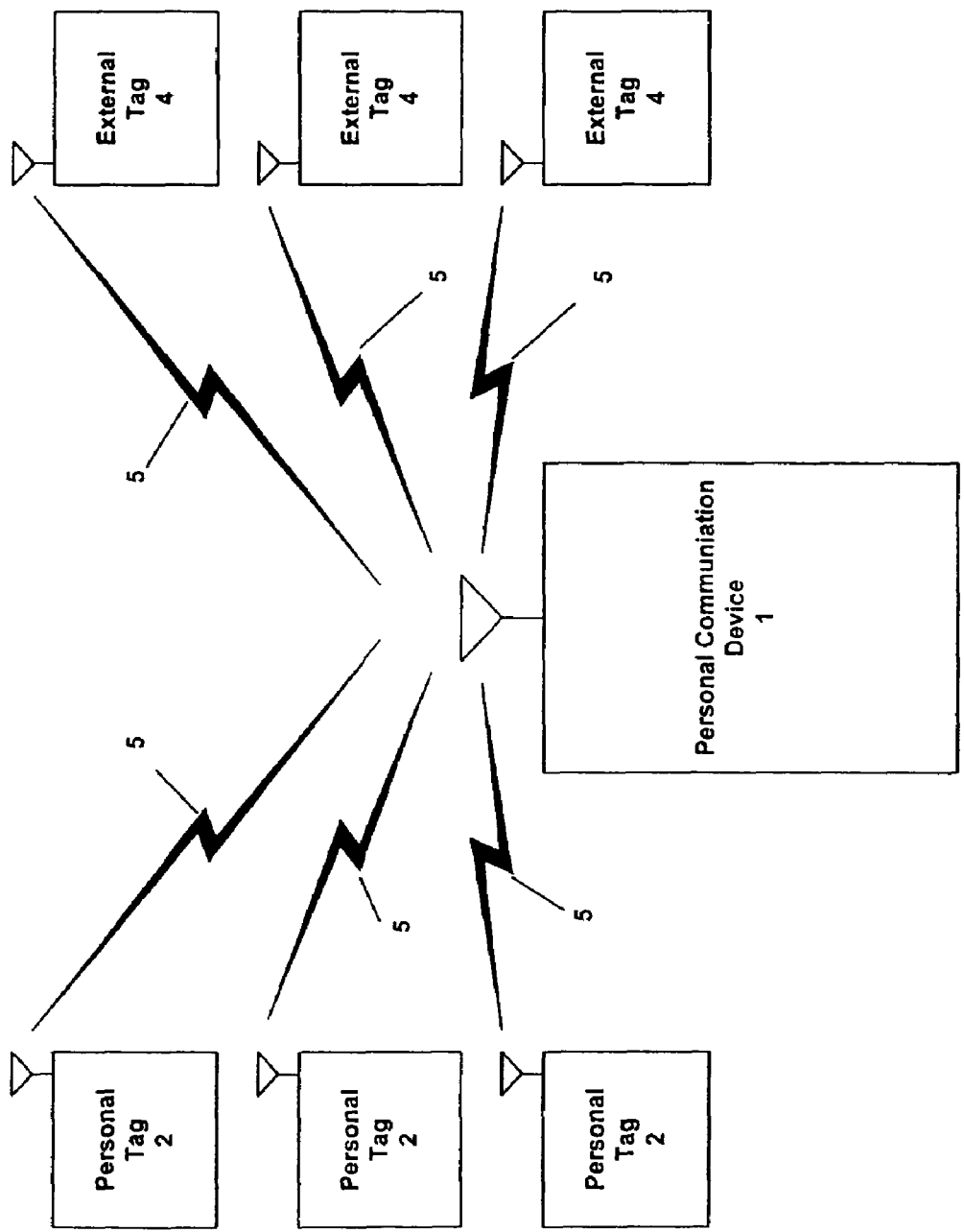
FIG. 1 is a system diagram in accordance with an embodiment of the invention

FIG. 1 illustrates a system diagram in accordance with an embodiment of the present invention. In FIG. 1, the personal communication device 1 is communicating wirelessly with a plurality of personal 2 and external 4 electronic tags. It is contemplated by the invention that the tags 2, 4 are radio frequency identification (RF-ID), Bluetooth or other wireless communication devices that emit a wireless signal 5 to an interrogator or tag reader (not shown), which is located in the personal communication device 1. The tags can be activated by a wireless signal received by the interrogator (passive) or can include a power supply (active) that activates the signal sent to the personal communication device 1. The signal 5 from the tags 2, 4 is received by the personal communication device 1 when the device enters the transmitting range of the tags 2, 4. The transmitting range of the tags 2, 4 can vary between substantially zero to hundreds of feet, and may vary in transmitting range between tags. For example, the personal tags 2 may have a much shorter transmitting range than the external tags 4. Additionally, it is contemplated by the invention that Bluetooth tags have a longer range than RF tags. Moreover, to conserve on power, it is contemplated that the personal communication device can be placed in a rest or sleep mode when the tags 2, 4 are out of transmitting range of the personal communication device 1, or if the personal communication device 1 is not in motion.

The personal tags 2 are first placed in specific locations by the user, for example on personal items or in a personal structure. The personal items may include, but are not limited to, articles of clothing, sporting equipment, luggage, personal accessories, and other personal effects of the user or the friend of a user. A personal structure may include, but is not limited to, a dwelling, automobile, boat or other similar structure. The external tags 4, on the other hand, are placed in specific locations by a third party. An example of a third party contemplated by the invention includes, but is not limited to, owners of train stations, bus stations, subway systems, taxi cabs of other the third party that offers services that may be of interest to the user of a communication device 1.

It is contemplated by the invention that the personal communication device 1 is also a wireless device that is hand-held or worn by the user. The personal communication device 1 can be a cellular telephone, a satellite telephone, a personal digital assistant or a Bluetooth device. By way of example, when a user carrying the personal communication device 1 enters the transmitting range of the tags 2, 4, the signal is received and processed by the communication device 1. The processing of the tag signal prompts the communication of data stored in the personal communication device that is of interest to the user and relevant to the location of the tags 2, 4, or triggers an application or service. In the case of an external tag 4, the signal may also include data related to services provided by a third party such as bus or train schedule information that can be communicated to the user. It is contemplated by the invention that the tags 2, 4 and the personal communication device 1 have the capability to transmit and receive data over a standard wireless communication channel 5 such as a radio frequency or Bluetooth channel.

Figure 2:
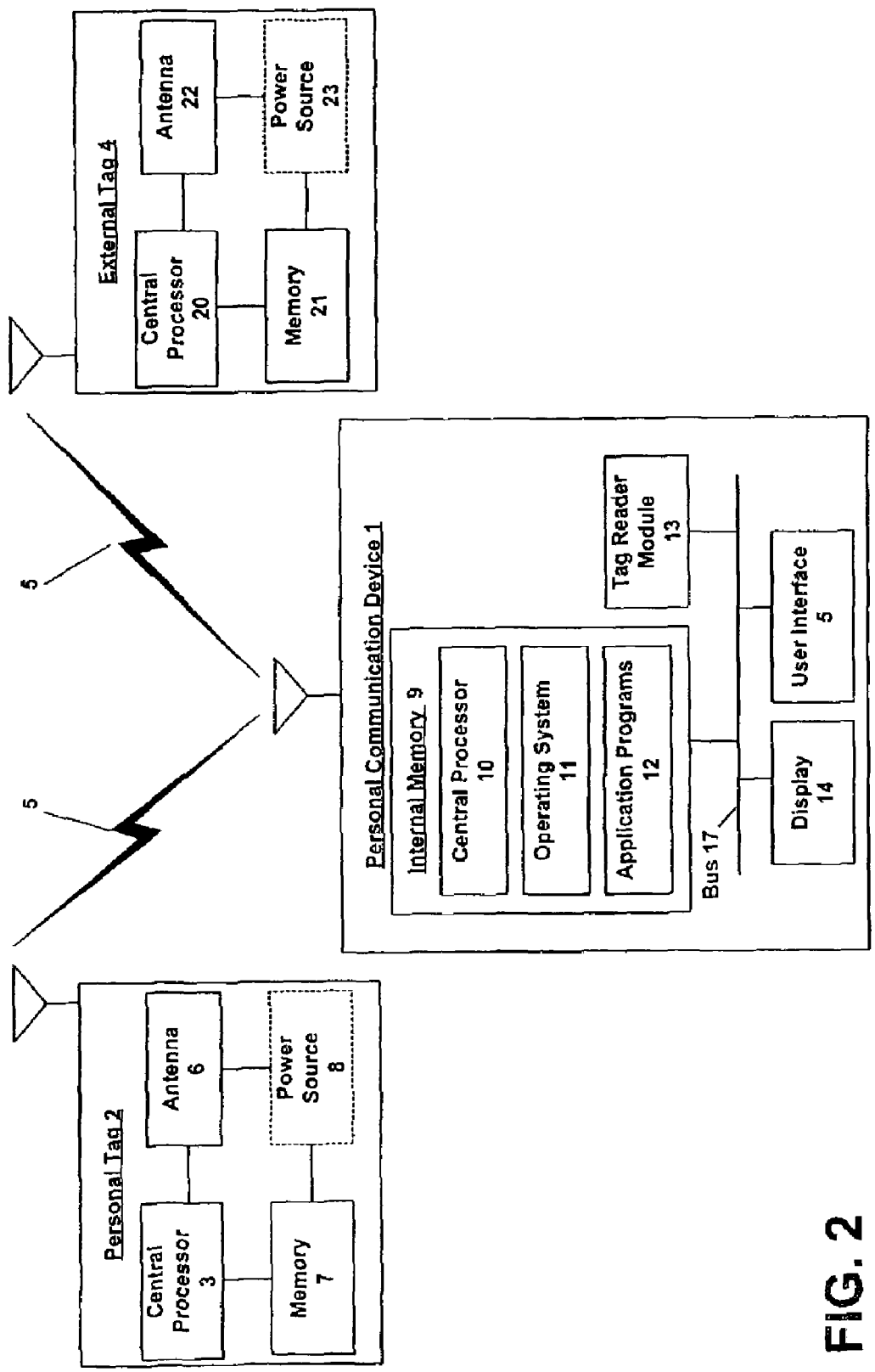
FIG. 2 is more detailed diagram of a personal tag, external tag and personal communication device in accordance with an embodiment of the present application.

FIG. 2 illustrates a more detailed diagram of a personal 2 and external 4 tag in communication with the personal communication device 1 in accordance with an embodiment of the invention. In FIG. 2, the tags 2, 4 includes several internal components that are essential to its operation that include a central processor 3, 20 a memory 7, 21 and antenna 6, 22. Additionally, the tags 2, 4 can also include an optional power supply 8, 23 depending on whether the tags 2, 4 is active or passive.

The central processor 3, 20 of the tags 2, 4 executes instructions for the transmission, reception and storage of data. The memory may comprise read-only (ROM), random access (RAM) and non-volatile programmable memory depending on the type and sophistication of the tags 2, 4. The antenna 6, 22 enables the tags 2, 4 to transmit and receive the wireless communications from the personal communication device 1. It is contemplated that the power supply is optional because the tags 2, 4 may be passive in that the tag 2 is energized by a signal from the tag reader module 13 in the personal communication device 1, not from a power supply 8, 23. However, if the tag 2, 4 is active, the tag 2, 4 is energized by the power supply 8, 23 to transmit a signal to the tag reader module 13 of the personal communication device 1. It is contemplated by the invention that the personal tags 2, will have a shorter range of transmission than the external tags. However, the range of the tags 2, 4 can vary depending on the sophistication of the tag 2, 4, the application, or other context e.g., at work your home tag reader will be at rest, when your moving, etc.

The personal communication device 1 includes several internal components essential to its operation such as a tag reader module 13, an internal memory 9, display 14 and user interface 15. The tag reader module 13 includes an antenna and decoder (not shown). The antenna enables wireless signals to be transmitted to and received from the personal communication device 1. The decoder reads the data in the signal received from the tag 2, 4, and forwards the information to the internal memory 9. The internal memory 9 comprises a central processor 10, operating system 11 and application programs 12. The central processor 10 executes instructions for the reception, transmission, storage and display of data, and the operating system 11 enables the execution of the application programs 12 for the display of relevant data stored in the internal memory 9 on the display 14. It is also contemplated by the invention that the user may also receive relevant data by a voice communication via a speaker, headphones or the like. The user is able to interact with the personal communication device 1 and utilize the data using the user interface 14. The user interface can be a keyboard, keypad, touch screen or similar user interface for inputting user instructions to the personal communication device 1.

Communication between the internal components of the personal communication device 1 is achieved via a bus 17, which provides as a common point of electrical connection for all the internal components of the device 1. The communication between the personal tag 2, 4 and the personal communication device 1 is achieved using a standard wireless communication channel 5 such as, but not limited to, a radio frequency or Bluetooth.

Figure 3:
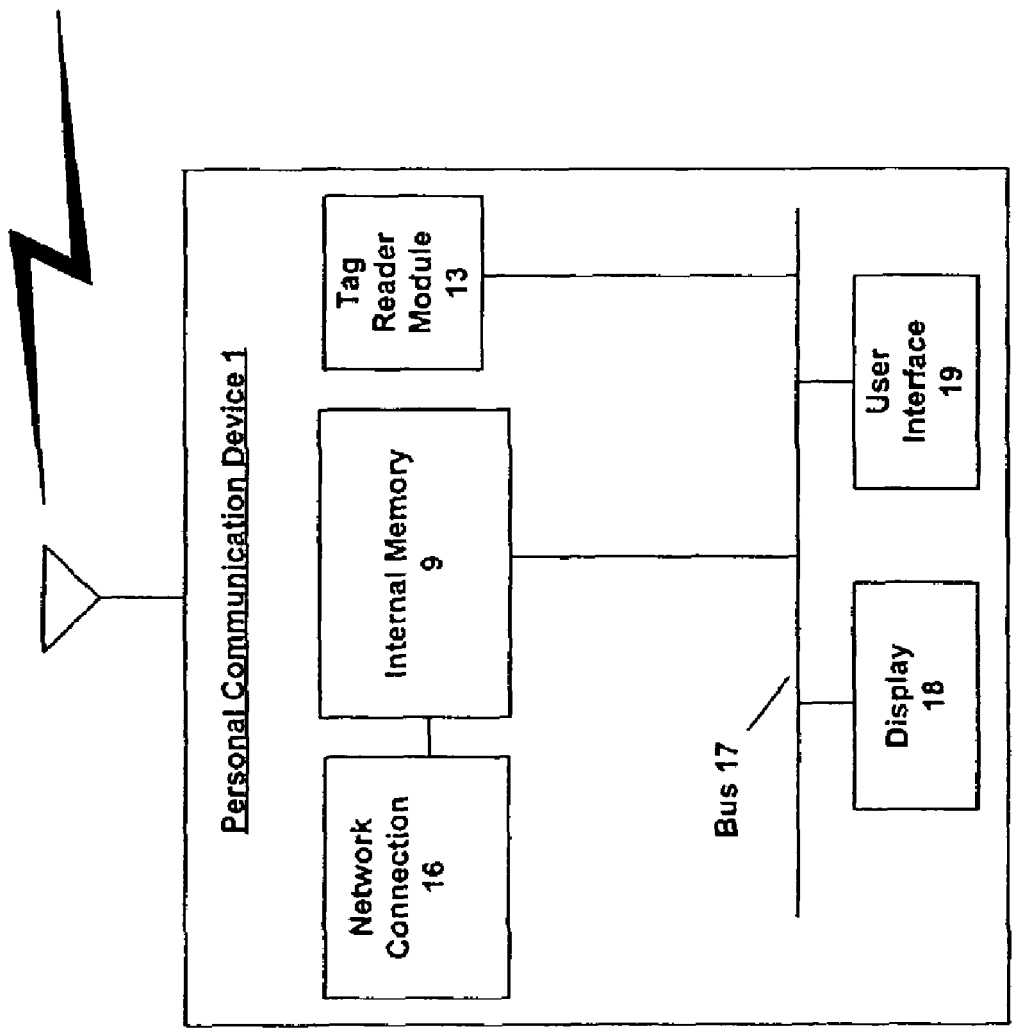
FIG. 3 is a more detailed diagram of a personal tag in accordance with an embodiment of the invention.

FIG. 3 illustrates a diagram of the personal communication device 1 in accordance with an embodiment of the invention. The main difference between the personal communication device of FIG. 3 is the addition of a network connection 16. The network connection 16 allows for data to be transmitted to and received from the personal communication device 1. The network connection 16 can be a wireless connection or a standard computer connection. It is contemplated by the invention that if the network connection 16 is wireless, it conforms to the principle of a Bluetooth standard protocol or other wireless LAN standard protocols such as, but in no way limited to, shared wireless access protocol (SWAP), Wireless Personal Area Network (WPAN) protocol, High Performance Radio Local Area Network (HIPERLAN) protocol, or Multimedia Mobile Access Communication (MMAC) protocol. The network connection 16 may also be any ordinary mobile telephone connection such as e.g., GSM, WAP EDGE, UMTS, or any similar connection. By way of example, the user of the personal communication device 1 can download data via the network connection 16 and store the data in the internal memory 9 of the device 1. The data can then be later communicated to the user upon receipt of a signal from the tag 2, 4 by the tag reader 13 of the personal communication device 1. The data communicated is of interest to the user and relevant to the location of the tags 2, 4 whose signal are received and processed by the personal communication device 1.

Figure 4:
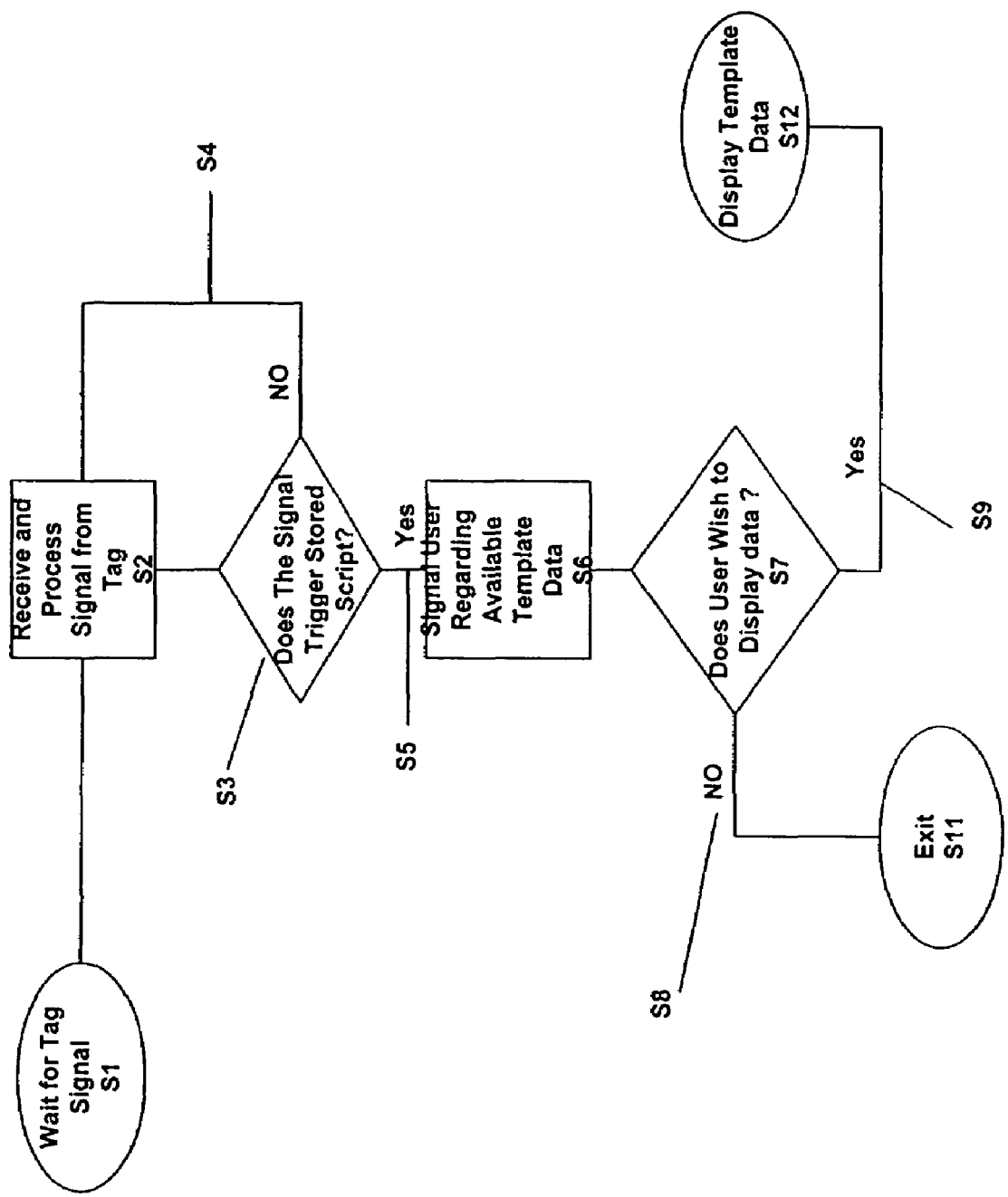
FIG. 4 is a flow chart illustrating a method in accordance with another embodiment of the present application.

FIG. 4 is a flow chart that exemplifies a method in accordance with an embodiment of the present invention. It is contemplated by the invention that the user has downloaded data into the memory 9 of the personal communication device 1. The data is comprised of templates or information corresponding to particular life scripts. The life scripts are essentially situations or contexts selected and created by the user that are relevant to the user's every day life e.g., work trip, ski vacation, shopping, exercising, workday, day off, etc. After establishing the life scripts, the user then downloads the templates to provide additional information related to the available the scripts e, g., scheduled meetings and clients, ski conditions, weather advisories, etc. Once the data is stored, the user carries the personal communication device with him/her to automatically communicate personalized information and trigger services or applications such as alarms, buying an e-ticket for a bus, etc. The data is provided upon the receipt of a signal from one or more tags 2, 4 proximate to the device. In one embodiment of the invention, the user may select the script to be used from a menu of all available scripts.

In step S1, the personal communication device waits for a signal from one or more tags. The tags can be active or passive as well as personal or external. In step S2, the personal communication device receives a signal from a tag proximate to the device. The tag reader 13, decodes the signal and forwards the tag information to the central processor 10 of the device 1. The information contained in the signal will include at least the ID of the tag 2, 4. In the case of an external tag 4, the signal may also include data provided by a third party e.g., train schedules or other services. Additionally, a signal can also be received from one or more tags simultaneously.

In step S3, the tag ID information is then forwarded by the central processor 10 to determine if tag data received corresponds to the data stored in the memory 9. It is contemplated by the invention that the processing of the signal includes the use of information such as time data, as well as tag ID data because the prompting of the life script may also vary depending on the time of day and location of the tags. For example, it would not be necessary to receive information related to scheduled lunch meetings late in the evening at home or driving home after work. In step S4, if no stored data matches the tag ID information, the reader continues to wait for other transmitted tag signals. In step S5, if a match is found, then in step S6 the central processor will execute the communication of data or signal the user that data is available for communication, or trigger a service or an application. In step S7, the user can chose to either receive the data S9 or not S8 and then exit the application S11. A similar choice can be made with regard to the receipt of a service or an application. In step S9, if the user decides to receive the stored data, then in step S12 the life script and corresponding template are made available to the user via the operating system 11 and application programs 12 in the memory 9 of the personal communication device 1. Thus, a combination of various tag ID information will result in the implementation of a predefined function structured by a user in the personal communication device 1 having an application program 12 for processing the signals from the tags.

Figure 5:
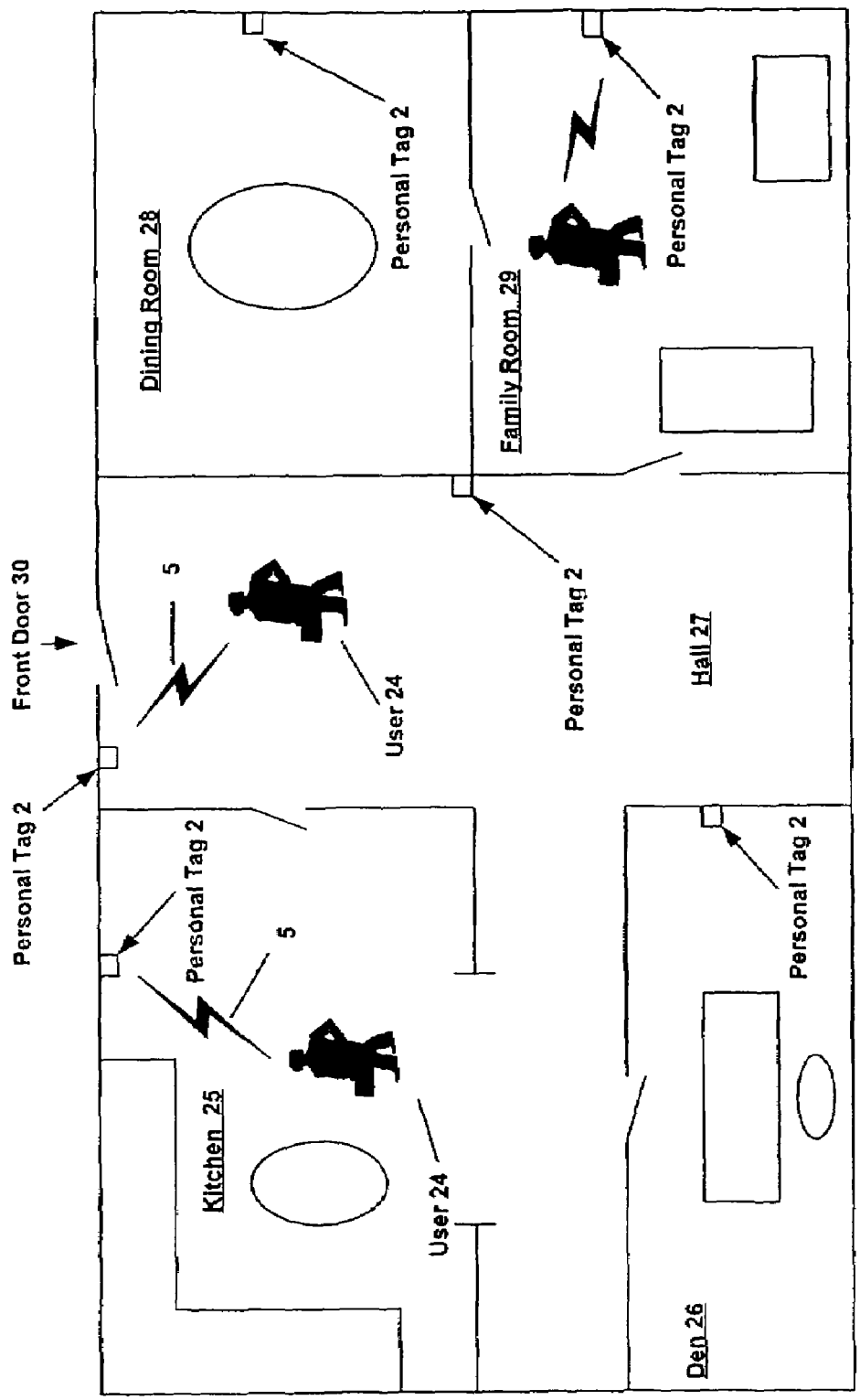
FIG. 5 is a diagram illustrating an operational environment in accordance with another embodiment of the present application.

FIG. 5 illustrates an operational environment using personal tags 2 in accordance with an embodiment of the present invention. In FIG. 5, the personal tags 2 are utilized in a dwelling. It is contemplated in FIG. 5 that the user 24 will be carrying of wearing the personal communication device 1. It is also contemplated in FIG. 5 that the user 24 has installed the tags 2 in several areas of the dwelling including the kitchen 25, the den 26, hall 31, the dining room 28, the family room 29 and proximate to the front door 30. The user selects locations at which he/she would like to receive information of interest or trigger a service or an application. For example, during a normal workday a user will enter the kitchen carrying a personal communication device 1 (not shown). Upon entering the transmission range of the tag 2 located in the kitchen 25, the signal 5 from the tag 2 will prompt the communication of data corresponding to, for example, the user's "Work Day" script on the personal communication device 1. This data is considered to be of interest to the user while he/she is in that location and may include information such as daily news, day calendar, scheduled meetings, alerts for missing items, etc. As seen in FIG. 5, as the user 24 heads toward the front door 30 the tag 2 proximate to the front door 30 may prompt the display of data corresponding to another script, which could contain information related to traffic and weather conditions, road maps, etc. As another possibility, the user 24 may enter the family room 29 where a tag 2 will prompt the display of data associated with TV viewing or the like. In this case, the data displayed may include a television guide for TV viewing for that particular evening, week, month, etc.

As mentioned previously, it is contemplated by the invention that the user 24 has previously selected scripts relevant to his/her life and downloaded data or templates related to those particular scripts for future functionality on the personal communication device 1.

Figure 6:
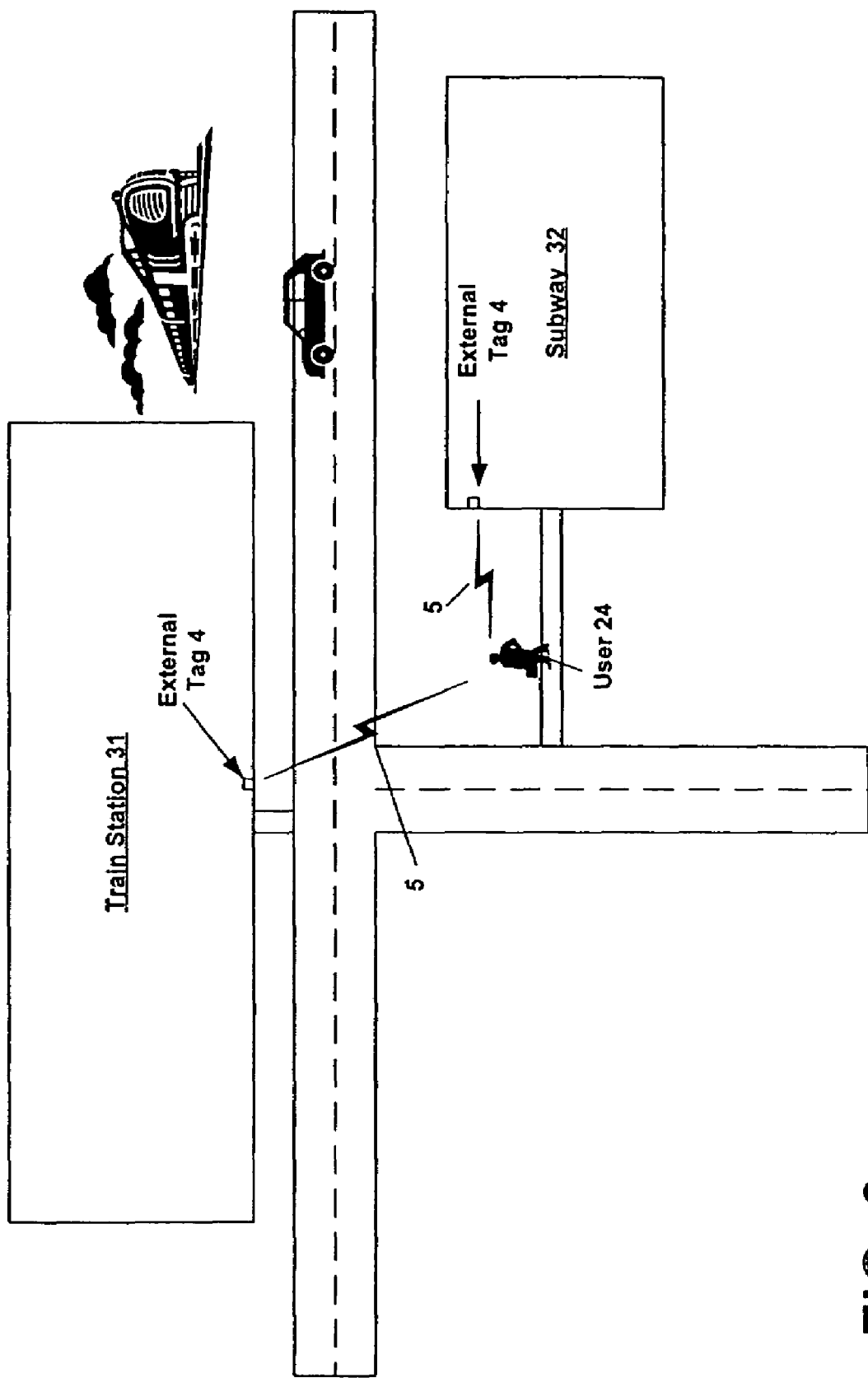
FIG. 6 is a diagram illustrating an operational environment in accordance with an embodiment of the present application.

FIG. 6 illustrates an operational environment using external tags 4 in accordance with an embodiment of the present invention. It is contemplated by FIG. 6 of the present invention that a third party has placed the tags in specific locations of interest to a user 24 of a personal communication device 1. In FIG. 6, a third party has placed external tags 4 in a location proximate to the subway 32 and the train station 31. The range of the external tags 4 are generally greater than the range of the personal tags 2 discussed in FIG. 5. In FIG. 6, as the user exits the subway 32, the tag 4 located proximate to the exit sends a signal to the personal communication device 1 (not shown) held or worn by the user 24. The signal from the tag 4 is decoded and the tag information is forwarded to the central processor 10 of the device 1. In the case of external tags 4, the tag information may include, but is not limited to, data related to services offered by a third party. For example, the tag proximate to the subway 32 exit may provide information such as street maps, historical sites, etc. Additionally, the tag information may also prompt the display of a data related to a life script stored previously by the user 24.

Additionally, in FIG. 6, as the user approaches the entrance to the train station 31, the external tag 4 located proximate to the entrance sends a signal 5 to the personal communication device 1 (not shown). Again, the signal is decoded and tag information is forwarded to the central processor 10 of the device 1. The tag information in this case may include third party information related to train schedules, train fees, triggering payment, etc.

Figure 7:
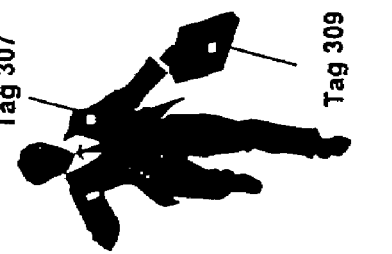
FIG. 7 is a table illustrating exemplary applications in accordance with an embodiment of the invention.
Figure 7:
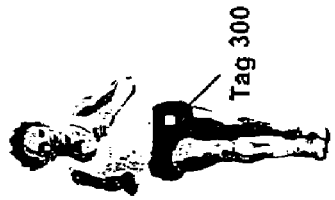
Figure 7:

FIG. 7 is a table illustrating several exemplary applications in accordance with an embodiment of the invention. FIG. 7 illustrates three different application using personal tags 300, 302, 305, 307, 309, 310. The first application in FIG. 7 to be discussed is a jogging activity, as illustrated in cell D2 of the table. In this application, it is contemplated that the user places a tag 300 on jogging shorts, as indicated in cells A2, D2, as a relevant item to be tagged. It is contemplated by the present invention that the user has created a "Day Off" script that is recognized by the personal communication device 1 based on a signal from tag 300, as indicated in cell B2 of the table. The personal communication device 1 is held or worn by the user and is proximate to the tag 300. Once the script is recognized, the personal communication device 1 then prompts the display of the template data corresponding to the script, as indicated in cell C2. The template includes information such as, but not limited to, jogging routes and a list of friends who also share an interest in jogging. The jogging application as explained above includes the use of a single personal tag 300 located on the jogging shorts owned by the user 24. However, it is also possible in certain application of the present invention to recognize stored life scripts based on more than one signal received from different tags, as indicated in the activities illustrated in cells D3 and D4 of the present invention.

In the ski activity illustrated in cell D3, it is contemplated that the user has placed personal tags 302, 305 on his/her ski jacket and car keys, as indicated in cell A3, as the relevant items to be tagged. As indicated in cell B3, the stored script associated with the ski activity will be prompted by signals from two tags 302, 303. Thus, both the user's car keys and jacket must be proximate to the personal communication device held or worn by the user. Once the signals from the two tags 302, 305 are received, the template associated with the "Ski Trip" script can be displayed on the personal communication device 1. As indicated in cell C3, the template may include information related to ski conditions and ski locations, as well as alerts about missing items such as e.g., a helmet or a pair of boots. However, it is also possible that the two tags 302, 305 could result in a different information when combined with other tags. In other words, the predefined function suggested by the communication device 1 might be different depending on the location of the user and the different combination of tag signals. The two tags 302, 305 at home may result in different information available to user then when the user is in the car, at the office, etc. For example, if the user is carrying or wearing items with the above tags 302, 305 at home, the combination of a signal from a home tag may result in the availability of data associated with new alerts for missing items such as gloves, hat, goggles, etc. Conversely, tags 302, 305 in a car may combine with a signal from a car mounted tag to yield much different information.

Cell D4 illustrates the final exemplary application of a workday activity in accordance with an embodiment of the present invention. It is contemplated in this example that the user places tags 307, 309, 310 on his/her suit, briefcase and car, as the relevant items to be tagged, as illustrated in cells A4. As indicated in cell B4, the "Work Day" script selected by the user is recognized by signals from the three different tags 307, 309, 310. Upon receipt of signals from all three tags 307, 309, 310 proximate to the personal communication device 1 held or worn by the user, the personal communication device 1 will prompt the communication of templates associated with the recognized "Work Day" script. As indicated in cell C4, the information available to the user will include, but is not limited to, scheduled business meetings, and day calendar.

In another embodiment of the present invention, tags 2 can be given to friends of the user. Thus, when the personal communication device comes into the transmitting range of a tag worn or held by a friend, the personal communication device 1 prompts the communication of a life script they may be of interest to both the user and the friend possessing the tag. For example, the template may include information related to activities that the user and the friend enjoy together.

In yet another embodiment of the present invention, tags 2 may be bought from a kiosk or the like and can be configured immediately.

In yet another embodiment of the present invention, the context information of the tag 2 may be added to a request sent by the user so that a service provider can personalize the services offered.

Presently, there is no existing technology that would be suitable for personalizing the functionality of a personal communication device as contemplated by the present invention. The advantage of the present invention as described herein is that it provides a more efficient use of a personal communication device by automatically communicating more relevant data to a user, or triggering a service or an application when it is most needed. Additionally, using the present invention it is possible to optimize the type of data stored and utilized by a personal communication device.

Although illustrative embodiments have been described herein in detail, its should be noted and understood that the descriptions and drawings have been provided for purposes of illustration only and that other variations both in form and detail can be added thereupon without departing from the spirit and scope of the invention. The terms and expressions have been used as terms of description and not terms of limitation. There is no limitation to use the terms or expressions to exclude any equivalents of features shown and described or portions thereof.

We claim:

1. A system for personalizing the functionality of a personal communication device, comprising:
   a personal communication device proximate to a user and equipped with an electronic tag reader;
   a plurality of electronic tags placed in a specific location pertinent to the user;
   a life script stored in the personal communication device, specifying functions related to a situation or context of the user that is relevant to the user's life, said life script being accessible by simultaneously accessing it with two or more of said unique tag identities received in signals from two or more tags proximate to the personal communication device; and
   template data stored in the personal communication device, in association with said life script to implement said functions specified by said life script;
   wherein when said personal communication device receives said signals from two or more tags, the stored life script is accessed and said associated template data implements said functions specified in said life script.

2. The system of claim 1, wherein said personal communication device and said at least one of the plurality of tags are wireless communication devices.

3. The system of claim 1, wherein said at least one of the plurality of tags conforms to the principles to RF-ID tag or Bluetooth tag technology.

4. The system of claim 3, where said at least one of the plurality of tags is a passive or active tag.

5. The system of claim 1, wherein data is stored in a memory location of said personal communication device by the user and used for triggering a request to a service provider for a service or an application upon receipt of a signal from at least one of the plurality of tags proximate to said personal communication device.

6. The system of claim 5, wherein said personal communication device further comprises a central processor and at least one application program for executing the display of data stored in said memory.

7. The system of claim 6, wherein said tag reader decodes the signal from said at least one of the plurality of tags and forwards information to said central processor for executing the communication of data stored in said memory.

8. The system of claim 1, wherein said plurality of tags are placed at different locations pertinent to the user.

9. The system of claim 8, wherein said function prompted upon the receipt of signals from two or more of said plurality of tags is related to the communication of data, or triggering a service or an application on said personal communication device.

10. The system of claim 1, wherein at least one of the plurality of tags is a personal tag affixed to personal items or affixed at personal locations by the user.

11. The system of claim 10, wherein said personal items includes articles of clothing, everyday accessories, luggage, sporting equipment, or other personal effects owned by the user or a friend of the user.

12. The system of claim 10, wherein said personal locations include house, garage, office, car, boat or other structure owned by the user or owned by a friend of the user.

13. The system to claim 1, wherein at least one of the plurality of tags is an external tag placed at a specific location by a third party.

14. The system of claim 13, wherein said external tag has a coverage area that is greater than the internal tag.

15. The system of claim 1, wherein said personal communication device further comprises a network connection for transmitting and receiving said data stored in the memory of the personal communication device.

16. The system of claim 15, wherein said network connection is a wireless connection and a protocol for transmitting data to and receiving data from said personal communication device via the connection is GSM, WAP EDGE, UMTS or other similar wireless mobile telephone network protocol.

17. The system of claim 15, wherein said network connection is a standard computer network connection for transmitting to and receiving data from said personal communication device.

18. The system of claim 1, wherein said personal communication device is a cellular telephone, a satellite telephone, a personal digital assistant or a Bluetooth device.

19. The system of claim 1, wherein a signal from at least one of the plurality of tags includes tag ID information.

20. The system of claim 19, wherein the tag ID is information which is mapped in said personal communication device to provide a predefined function.

21. The system of claim 19, wherein at least two of the plurality of tag IDs are mapped in said personal communication device to provide a predefined function.

22. The system of 19, wherein the user of the personal communication device maps the IDs to provide a desired predefined function.

23. The system of claim 1, wherein a signal from at least one of the plurality of tags includes third party data to be displayed on said personal communication device.

24. The system of claim 1, wherein said tag reader has a rest mode wherein no tag signals are received by the personal communication device.

25. The system of claim 1, wherein at least one of the plurality of tags includes a power supply.

26. The system of claim 1, wherein data is communicated to the user of the personal communication device using visual data or voice data.

27. An apparatus for personalizing the functionality of a personal communication device, comprising:
- an electronic tag reader for receiving and decoding signals, at least one signal containing tag information from a plurality of electronic tags proximate to a personal communication device;
- a life script stored in the personal communication device, specifying functions related to a situation or context of the user that is relevant to the user's life, said life script being accessible by simultaneously accessing it with two or more of said unique tag identities received in signals from two or more tags proximate to the personal communication device; and
- template data stored in the personal communication device, in association with said life script to implement said functions specified by said life script;
- a central processor for executing said life script on the personal communication device after receipt of tag information for said two or more tags from said electronic tag reader;
- at least one application program for executing the display of data on the personal communication device based on implementing at least one of said functions and
- a data communication device for communicating data from said personal communication device based on said implemented function;
- wherein when said personal communication device receives said signals from two or more tags, the stored life script is accessed and said associated template data implements said functions specified in said life script.

28. The apparatus of claim 27, further comprising a network connection for receiving the data to and transmitting data from the personal communication device.

29. The apparatus of claim 28, wherein said network connection is wireless and a protocol for transmitting data to and receiving data from said personal communication device via the network connection is GSM, WAP EDGE, UMTS or other similar wireless mobile telephone network protocol.

30. The apparatus of claim 27, wherein said network connection is a standard computer network connection for transmitting to and receiving data from said personal communication device.

31. The apparatus of claim 27, further comprising a user interface to enable a user to interact with said personal communication device.

32. The apparatus of claim 27, wherein said function implemented upon the receipt of signals from two or more of said plurality of tags is related to the communication of data stored in a memory location, or triggering a service or an application on the personal communication device.

33. The apparatus of claim 27, wherein said personal communication device is a cellular telephone, a satellite telephone, a personal digital assistant or a Bluetooth device.

34. The apparatus of claim 27, wherein said tag reader has a rest mode wherein no tag signals are received by the personal communication device.

35. The system of claim 27, wherein the data is communicated to the user of the personal communication device using visual data or voice data.

36. A method for personalizing the functionality of a personal communication device, comprising:
- placing a plurality of electronic tags in specific locations pertinent to a user;
- storing data in a memory location of a personal communication device that is of interest to the user and related to the location of said plurality of tags;
- receiving at a tag reader in the personal communication device signals from said plurality of tags, at least one signal containing tag information;
- decoding said signals received for said plurality of tags and forwarding tag information to a central processor of the personal communication device;
- executing a life script stored in the personal communication device, specifying functions related to a situation or context of the user that is relevant to the user's life, said life script being accessible by simultaneously accessing it with two or more of said unique tag identities received in signals from two or more tags proximate to the personal communication device;
- accessing template data stored in the personal communication device, in association with said life script to implement said functions specified by said life script;
- performing at least one of said functions on the personal communication device based on tag information from said two or more tags; and
- communicating data to the user via said personal communication device based on the performed function, wherein the performed function is related to the specific location of said two or more tags whose signals are received by the personal communication device.

37. The method of claim 36, wherein said personal communication device and said plurality of tags are wireless communication devices.

38. The method of claim 36, wherein said at least one electronic tag conforms to the principles to RF-ID tag or Bluetooth tag technology.

39. The method of claim 36, where said at least one electronic tag is a passive or active tag.

40. The method of claim 36, wherein data is placed in said memory location of said personal communication device by the user and used for triggering a request to a service provider for a service or an application upon receipt of said signal from said at least one electronic tag proximate to said personal communication device.

41. The method of claim 36, wherein said personal communication device further comprises performing said functions using an application program in the memory of the personal communication device.

42. The method of claim 36, wherein said placement of said plurality of tags further comprises placing said plurality of tags at different locations pertinent to the user.

43. The method of claim 36, wherein said function performed upon the receipt of signals from two or more of said plurality of tags is related to communication of the relevant data stored in said memory, or triggering a service or an application on the personal communication device.

44. The method of claim 36, wherein said at least one tag is a personal tag affixed to personal items or personal locations by the user.

45. The method to claim 36, wherein said at least one tag is an external tag placed at a specific location by a third party.

46. The method of claim 36, further comprising transmitting the data from and receiving the data to said personal communication device via a network connection.

47. The method of claim 46, wherein the network connection is wireless and a protocol for transmitting data to and receiving data from said personal communication device via the network connection is GSM, WAP EDGE, UMTS or other similar wireless mobile telephone network protocol.

48. The method of claim 46, wherein the network connection is a standard network connection for transmitting to and receiving data from said personal communication device.

49. The method of claim 36, wherein said personal communication device is a cellular telephone, a satellite telephone, a personal digital assistant or a Bluetooth device.

50. The method of claim 36, wherein said signal from at least one tag of the plurality of tags includes tag ID information.

51. The system of claim 50, wherein the tag ID is information is mapped in said personal communication device to provide a predefined function.

52. The system of claim 50, wherein said at least two of the plurality of tag IDs are mapped in said personal communication device to provide a predefined function.

53. The system of 50, wherein the user of the personal communication device maps the IDs to provide a desired predefined function.

54. The method of claim 36, wherein said signal from at least one tag of the plurality of tags includes third party data to be displayed on said personal communication device.

55. The method of claim 36, wherein an external tag has a coverage area that is greater than an internal tag.

56. The method of claim 36, wherein said tag reader has a rest mode wherein tag signals are not received by the personal communication device.

57. The method of claim 36, wherein said at least one tag includes a power supply.

58. The method of claim 36, wherein the data is communicated to the user of the personal communication device using visual data or voice data.

59. A computer program product for personalizing the functionality of a personal communication device, comprising:
 a computer readable medium;
 program code in said computer readable medium for storing data in a memory location of a personal communication device that is of interest to a user and related to locations of a plurality of electronic tags;
 program code in said computer readable medium for receiving at a tag reader in the personal communication device signals from said plurality of tags, at least one signal containing tag information;
 program code in said computer readable medium for decoding said signals received for said plurality of tags and forwarding the tag information to a central processor of the personal communication device;
 program code in said computer readable medium for executing a life script stored in the personal communication device, specifying functions related to a situation or context of the user that is relevant to the user's life, said life script being accessible by simultaneously accessing it with two or more of said unique tag identities received in signals from two or more tags proximate to the personal communication device;
 program code in said computer readable medium for accessing template data stored in the personal communication device, in association with said life script to implement said functions specified by said life script;
 program code in said computer readable medium for performing at least one of said functions on the personal communication device based on the tag information from two or more tags; and
 program code in said computer readable medium for communicating data to the user via said personal communication device based on said performed function, wherein the performed function is related to a specific location of said two or more tags whose signals are received by the personal communication device.

60. The computer program product of claim 59, wherein said personal communication device and said plurality of tags are wireless communication devices.

61. The computer program product of claim 59, wherein said at least one electronic tag conforms to the principles to RF-ID tag or Bluetooth tag technology.

62. The computer program product of claim 59, wherein said at least one electronic tag is a passive or active tag.

63. The computer program product of claim 59, further comprising program code for allowing the user to store data in the memory of the personal communication device and use the data for triggering a request to a service provider for a service or an application upon receipt of a signal from said at least one electronic tag proximate to said personal communication device.

64. The computer program product of claim 59, further comprising program code for performing said function using an application program in the memory of the personal communication device.

65. The method of claim 59, wherein the program code for executing or prompting said function is based upon the receipt of signals from two or more tags.

66. The computer program product of claim 59, wherein said at least one tag of said plurality of tags is a personal tag affixed to personal items or personal locations by the user.

67. The computer program product of claim 59, wherein said at least one tag of said plurality of tags is an external tag placed at a specific location by a third party.

68. The computer program product of claim 59, further comprising program code for establishing a network connection for transmitting data to and receiving data from said personal communication device.

69. The computer program product of claim 68, wherein the network connection is wireless and a protocol for transmitting data to and receiving data from said personal communication device via the network connection is GSM, WAP EDGE, UMTS or other similar wireless mobile telephone network protocol.

70. The computer program product of claim 68, wherein the network connection is a standard computer network connection for transmitting to and receiving data from said personal communication device.

71. The computer program product of claim 59, wherein said personal communication device is a cellular telephone, a satellite telephone, a personal digital assistant or a Bluetooth device.

72. The computer program product of claim 59, further comprising program code for receiving and processing tag ID information from said plurality of tags.

73. The computer program product of claim 72, wherein the tag ID is information which is mapped in said personal communication device to provide a predefined function.

74. The computer program product of claim 72, wherein said at least two of the plurality of tag IDs are mapped in said personal communication device to provide a predefined function.

75. The computer program product of claim 72, wherein the user of the personal communication device maps the IDs to provide a desired predefined function.

76. The computer program product of claim 59, further comprising program code for receiving and processing third party data from said plurality of tags.

77. The computer program product of claim 59, further comprising program code for placing said tag reader in a rest-mode so that tag signals are not received by the personal communication device.

78. The computer program product of claim 59, wherein the data is communicated to the user of the personal communication device using visual data or voice data.

* * * * *